United States Patent
Lu et al.

(10) Patent No.: US 12,389,371 B2
(45) Date of Patent: Aug. 12, 2025

(54) METHOD FOR SELECTING TRANSMISSION RESOURCE, METHOD FOR SELECTING TRANSMISSION DATA, AND TERMINAL

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 528 days.

(21) Appl. No.: 17/503,476

(22) Filed: Oct. 18, 2021

(65) Prior Publication Data
US 2022/0039067 A1 Feb. 3, 2022

Related U.S. Application Data

(63) Continuation of application No. PCT/CN2019/084688, filed on Apr. 26, 2019.

(51) Int. Cl.
*H04W 72/02* (2009.01)
*H04L 1/1812* (2023.01)
*H04L 5/00* (2006.01)

(52) U.S. Cl.
CPC .......... *H04W 72/02* (2013.01); *H04L 1/1819* (2013.01); *H04L 5/0053* (2013.01)

(58) Field of Classification Search
CPC ..... H04W 72/02; H04W 72/543; H04W 4/40; H04W 72/54; H04W 72/56; H04W 88/02;
(Continued)

(56) References Cited

U.S. PATENT DOCUMENTS

2017/0214497 A1 7/2017 Lee et al.
2017/0230958 A1* 8/2017 Lee ........................ H04W 72/54
(Continued)

FOREIGN PATENT DOCUMENTS

CN 102892145 A 1/2013
CN 106559874 A 4/2017
(Continued)

OTHER PUBLICATIONS

3GPP TSG RAN Meeting #80—RP-181429—La Jolla, USA, Jun. 11-14, 2018—Vodafone, New SID: Study on NR V2X (15 pages).
3GPP TSG-RAN WG2 Meeting #105—R2-1901116—Athens, Greece, Feb. 25-Mar. 1, 2019—vivo, Different destination service multiplexing in MAC (3 pages).
3GPP TSG-RAN WG2 Meeting #105bis—R2-1903632—Xi'an, China, Apr. 8-Apr. 12, 2019—vivo, Sidelink Configured Grant in NR V2X (3 pages).
(Continued)

*Primary Examiner* — Tejis Daya
(74) *Attorney, Agent, or Firm* — PERKINS COIE LLP

(57) ABSTRACT

Disclosed are a method for selecting a transmission resource, a method for selecting transmission data, a terminal, a chip, a computer-readable storage medium, a computer program product, and a computer program. The method comprises: selecting a first transmission resource from among at least one transmission resource according to the attribute configuration of the at least one transmission resource, wherein the transmission resource is one of the following: a carrier, a resource pool and a resource; and carrying out data transmission on the basis of the selected first transmission resource, wherein the attribute configuration comprises a related configuration of a hybrid automatic repeat request (HARQ), and/or an association relationship between the transmission resource and data to be transmitted.

7 Claims, 3 Drawing Sheets

A first transmission resource is selected from at least one transmission resource according to an attribute configuration of the at least one transmission resource — 11

Data transmission is performed based on the selected first transmission resource — 12

(58) Field of Classification Search
CPC .... H04W 72/20; H04L 1/1819; H04L 5/0053; H04L 1/1812; H04L 1/1893; H04L 5/0044
See application file for complete search history.

(56) References Cited

U.S. PATENT DOCUMENTS

| | | | | |
|---|---|---|---|---|
| 2018/0324844 | A1* | 11/2018 | Babaei | H04W 72/21 |
| 2019/0045489 | A1* | 2/2019 | He | H04L 1/1812 |
| 2019/0124015 | A1* | 4/2019 | Loehr | H04W 76/23 |
| 2020/0029340 | A1* | 1/2020 | He | H04W 72/25 |
| 2020/0059766 | A1 | 2/2020 | Kim et al. | |
| 2020/0084761 | A1* | 3/2020 | Baldemair | H04L 5/0044 |
| 2020/0092692 | A1 | 3/2020 | Wang et al. | |
| 2020/0322939 | A1* | 10/2020 | Cao | H04W 72/02 |
| 2020/0359366 | A1* | 11/2020 | Kim | H04B 7/0695 |
| 2020/0389912 | A1* | 12/2020 | Baldemair | H04W 72/232 |
| 2020/0403737 | A1* | 12/2020 | Yeo | H04L 1/1861 |
| 2021/0168814 | A1* | 6/2021 | Chen | H04W 72/02 |
| 2021/0410129 | A1* | 12/2021 | Freda | H04W 76/18 |

FOREIGN PATENT DOCUMENTS

| | | |
|---|---|---|
| CN | 108400850 A | 8/2018 |
| CN | 108923894 A | 11/2018 |
| CN | 109075921 A | 12/2018 |
| WO | 2019066558 A1 | 4/2019 |

OTHER PUBLICATIONS

International Search Report issued Jan. 21, 2020 of PCT /CN2019/ 084688 (4 pages).
Examination Report for European Application No. 19926549.7 issued on Apr. 4, 2023. 6 pages.
Examination Report for European Application No. 19926549.7 Issued on Sep. 20, 2023, 5 Pages.
Examination Report for European Application No. 19926549.7 issued Nov. 8, 2022. 6 pages.
First Office Action for Chinese Application No. 202111179364.7 issued Jan. 11, 2023. 12 pages with English translation.
CMCC "Discussion on HARQ feedback and CSI acquisition for sidelink" R1-1812879; 3GPP TSG RAN WG1 Meeting #95; Spokane, USA; Nov. 12-16, 2018. 5 pages.
Extended European Search Report for European Application No. 19926549.7 issued Mar. 17, 2022. 9 pages.
Notice of Preliminary Rejection of Korean application No. 10-2021-7036527 issued on Feb. 22, 2024, 14 pages with English translation.
Notice of allowance of Korean application No. 10-2021-7036527 issued on May 22, 2024, 4 pages with English translation.
R1-1812307: "Physical layer procedure for NR sidelink", 3GPP TSG RAN WG1 Meeting #95, Spokane, USA, Nov. 12-16, 2018, 7 pages.
R1-1905443: "Discussion on physical layer procedures for NR sidelink", 3GPP TSG RAN WG1 Meeting #96bis, Xi'an, China, Apr. 8-12, 2019, 12 pages.
Search report for European Application No. 24175349.0 Issued Aug. 30, 2024, 9 Pages.

* cited by examiner

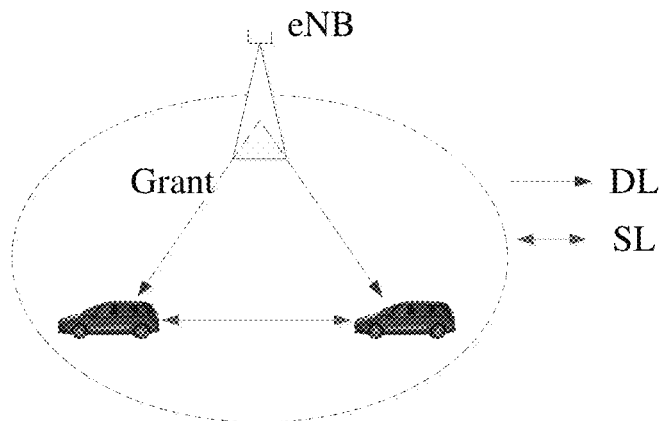
FIG. 1
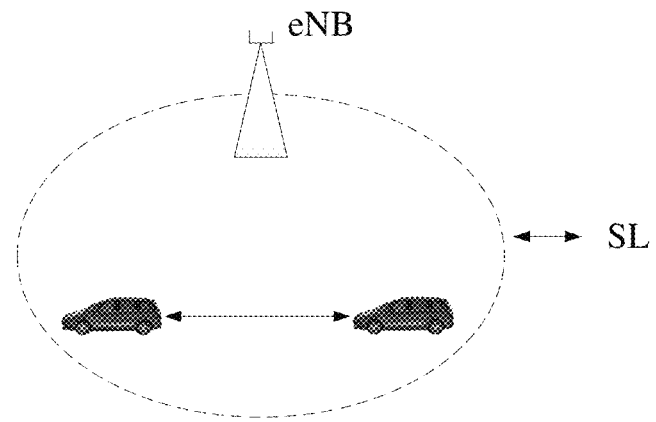
FIG. 2
A first transmission resource is selected from at least one transmission resource according to an attribute configuration of the at least one transmission resource — 11
Data transmission is performed based on the selected first transmission resource — 12
FIG. 3

METHOD FOR SELECTING TRANSMISSION RESOURCE, METHOD FOR SELECTING TRANSMISSION DATA, AND TERMINAL

CROSS-REFERENCE TO RELATED APPLICATIONS

The present application is a continuation application of International PCT Application No. PCT/CN2019/084688, having an international filing date of Apr. 26, 2019. The content of the above-identified application is hereby incorporated by reference.

TECHNICAL FIELD

The present application relates to the technical field of information processing, in particular to a method for selecting a transmission resource, a method for selecting transmission data, a terminal, a chip, a computer readable storage medium, a computer program product, and a computer program.

BACKGROUND

A Vehicle networking system is a Sidelink (SL) transmission technology based on Long Term Evolution-Device to Device (LTE-D2D). In Rel-14 of the 3rd Generation Partnership Project (3GPP), a Vehicle to Everything (V2X) technology is standardized, and two transmission modes, mode A and mode B, are defined. In the mode A, a transmission resource of a terminal is allocated by a base station. The terminal sends data on a sidelink according to the resource allocated by the base station; and the base station may allocate, to the terminal, a resource for a single transmission or a resource for semi-static transmission. In the mode B, a vehicle terminal selects one resource in a resource pool for data transmission.

However, in existing D2D/V2X processing of selecting a resource and data, adaptability between the data and the resource cannot be guaranteed.

SUMMARY

In order to solve the above technical problem, implementations of the present application provide a method for selecting a transmission resource, a method for selecting transmission data, a terminal, a chip, a computer readable storage medium, a computer program product, and a computer program.

In a first aspect, a method for selecting a transmission resource is provided, applied to a first terminal, including: selecting a first transmission resource from at least one transmission resource according to an attribute configuration of the at least one transmission resource; herein, the transmission resource is one of the following: a carrier, a resource pool, or a resource; and performing data transmission based on the selected first transmission resource; herein, the attribute configuration includes a related configuration of Hybrid Automatic Repeat reQuest (HARQ), and/or an association relationship between a transmission resource and data to be transmitted.

In a second aspect, a method for selecting transmission data is provided, applied to a first terminal, including: selecting at least one first logical channel according to a first attribute requirement of at least one piece of data to be transmitted or a logical channel containing data to be transmitted in the at least one logical channel of the first terminal; herein, the first attribute requirement includes a related configuration of HARQ, and/or an association relationship between a transmission resource and a logical channel; the transmission resource is one of the following: a carrier, a resource pool, or a resource; generating a media access control (MAC) protocol data unit (PDU) based on a radio link control (RLC) PDU of the at least one first logical channel; and sending the MAC PDU on a target transmission resource.

In a third aspect, a terminal is provided, including: a first processing unit, configured to select a first transmission resource from at least one transmission resource according to an attribute configuration of the at least one transmission resource; herein, the transmission resource is one of the following: a carrier, a resource pool, or a resource; and a first communication unit, configured to perform data transmission based on the selected first transmission resource; herein, the attribute configuration includes a related configuration of Hybrid Automatic Repeat reQuest (HARQ), and/or an association relationship between a transmission resource and data to be transmitted.

In a fourth aspect, a terminal is provided, including: a second processing unit, configured to select at least one first logical channel according to a first attribute requirement of at least one piece of data to be transmitted or a logical channel containing data to be transmitted in at least one logical channel of the terminal; herein, the first attribute requirement includes a related configuration of HARQ, and/or an association relationship between a transmission resource and a logical channel; the transmission resource is one of the following: a carrier, a resource pool, or a resource; generate a media access control (MAC) protocol data unit (PDU) based on a radio link control (RLC) PDU of the at least one first logical channel; and a second communication unit, configured to send the MAC PDU on a target transmission resource.

In a fifth aspect, a terminal is provided, including a processor and a memory. The memory is configured to store a computer program, and the processor is configured to call and run the computer program stored in the memory to perform the method in the first aspect, the second aspect described above or various implementations thereof.

In a sixth aspect, a chip is provided, which is configured to perform the method in any one of the above first aspect and second aspect or in various implementations thereof.

Specifically, the chip includes a processor configured to call and run a computer program from a memory and a device having the chip installed therein performs the method according to any one of the first and second aspects described above or any of various implementations thereof.

In a seventh aspect, a computer-readable storage medium is provided for storing a computer program that causes a computer to execute the method in any one of the above first aspect and second aspect or in various implementations thereof.

In an eighth aspect, a computer program product is provided, including computer program instructions that cause a computer to execute the method in any one of the above first aspect and second aspect or in various implementations thereof.

In a ninth aspect, a computer program is provided, when being run on a computer, causes the computer to execute the method in any one of the above first aspect and second aspect or in various implementations thereof.

Based on the technical solution of the implementation of the present application, a first transmission resource conforming to a requirement is selected according to an attribute configuration, such as a related configuration including HARQ and an association relationship between a transmission resource and data to be transmitted; therefore, the selected transmission resource is made to be more satisfied with a requirement of data transmission, and adaptability between the data that needs to be transmitted and the transmission resource is also made to be higher.

BRIEF DESCRIPTION OF DRAWINGS

FIG. 1 is a first schematic diagram of architecture of a D2D communication system according to an implementation of the present application.

FIG. 2 is a second schematic diagram of architecture of a D2D communication system according to an implementation of the present application.

FIG. 3 is a schematic flowchart of a method for selecting a transmission resource according to an implementation of the present application.

DETAILED DESCRIPTION

Figure 4:
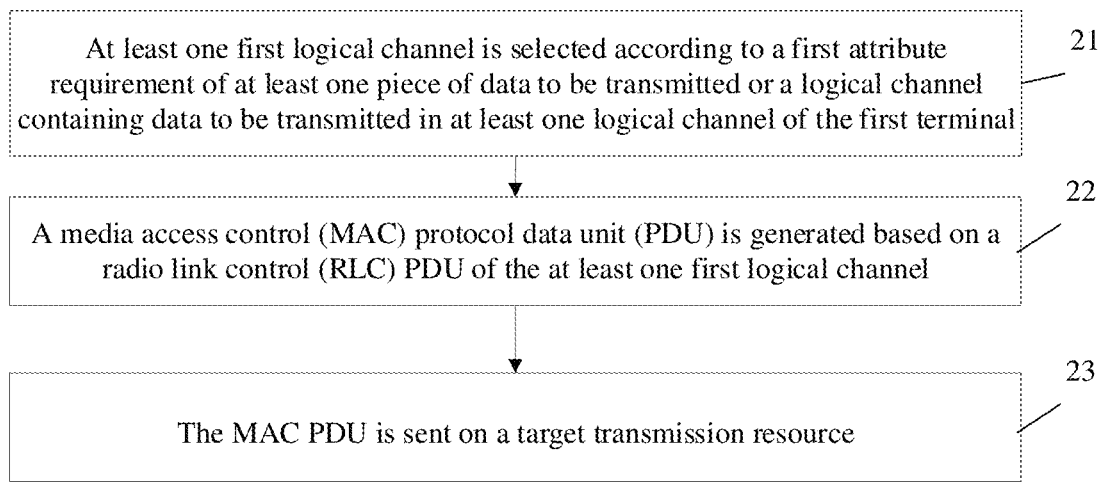
FIG. 4 is a schematic flowchart of a method for selecting transmission data according to an implementation of the present application.

Technical solutions in implementations of the present application will be described below with reference to the drawings in the implementations of the present application. It is apparent that the implementations described are just some of the implementations of the present application, but not all of the implementations of the present application. According to the implementations of the present application, all other implementations achieved by a person of ordinary skill in the art without making inventive efforts are within the protection scope of the present application.

The solution provided by implementations of the present application may be applied to a Vehicle networking system provided in FIGS. 1 and 2, wherein the Vehicle networking system is a Sidelink (SL) transmission technology based on LTE-Device-to-Device (D2D), and has a higher spectrum efficiency and a lower transmission delay. In Release 14 (Rel-14) of the 3rd generation partnership project (3GPP), a Vehicle-to-Everything (V2X) technology is standardized, and two transmission modes are defined: mode 3 and mode 4. Herein, the mode 3: as shown in FIG. 1, a transmission resource of a terminal device, i.e., a vehicle terminal, is allocated by a base station. The vehicle terminal performs transmission of the data on a sidelink according to the resource allocated by the base station. The base station may allocate, to the terminal, a resource for a single transmission or a resource for semi-static transmission. The mode 4: as shown in FIG. 2, the vehicle terminal uses a transmission mode of sensing+reservation. The vehicle terminal acquires a set of available transmission resources in a resource pool by sensing, and the terminal randomly selects a resource from the set for data transmission.

It should be understood that the terms "system" and "network" herein are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

An implementation of the present application provides a method for selecting a transmission resource, which is applied to a first terminal. As shown in FIG. 3, the method includes acts 11 to 12.

In act 11, a first transmission resource is selected from at least one transmission resource according to an attribute configuration of the at least one transmission resource; herein, the transmission resource is one of the following: a carrier, a resource pool, or a resource; herein, the attribute configuration includes a related configuration of Hybrid Automatic Repeat reQuest (HARQ), and/or an association relationship between a transmission resource and data to be transmitted.

In act 12, data transmission is performed based on the selected first transmission resource.

Herein, the carrier, the resource pool, and the resource may be understood as transmission resources with different granularity.

The solution provided in the implementation of the present application may be applied to a D2D scenario or another scenario, such as a Cellular scenario. It should be pointed out that the data transmission is performed based on the selected first transmission resource, which may specifically be, in the D2D scenario: communication is performed with a second terminal based on the selected first transmission resource; and which may specifically be, in another scenario, such as the Cellular scenario: communication is performed with a network device based on the selected first transmission resource.

Based on the foregoing solution, the implementation of the present application may further include: data to be transmitted a logical channel containing the data is selected by using the first transmission resource, from the at least one piece of the data to be transmitted or a logical channel containing the data to be transmitted, based on the attribute configuration of the at least one transmission resource. That is, the data to be transmitted finally may also be selected according to an attribute of a transmission resource as well as the attribute requirement.

Herein, based on the attribute configuration of the at least one transmission resource, which may be based on the attribute configuration of the at least part of transmission resource and based on the attribute requirement of the at least one piece of the data to be transmitted or the logical channel containing the data to be transmitted, the data to be transmitted corresponding to the attribute configuration of at least part of the transmission resource or the logical channel containing the data to be transmitted may be selected, as the data to be transmitted finally on the first transmission resource or the logical channel containing the data to be transmitted, or, may be based on the attribute configuration of the first transmission resource in the at least one transmission resource and based on the attribute requirement of at least one piece of the data to be transmitted or the logical channel containing the data to be transmitted, the data to be transmitted corresponding to the attribute configuration of the first transmission resource or the logical channel containing the data to be transmitted may be selected as the data to be transmitted finally on the first transmission resource or the logical channel containing the data to be transmitted In act 11, the first transmission resource is selected from the at least one transmission resource according to the attribute configuration of the at least one transmission resource, including: the first transmission resource is selected from the at least one transmission resource according to the attribute configuration of the at least one transmission resource and at least one target attribute.

Herein, the method for determining the target attribute may include: the at least one target attribute is determined based on the attribute requirement of at least part of the at least one piece of the data to be transmitted; or, the at least one target attribute is determined based on the attribute requirement of the at least part of the at least one logical channel containing the data to be transmitted.

For example, determining the target attribute may be, taking an attribute requirement contained in the at least one piece of the data to be transmitted or most of the data to be transmitted in the logical channel containing the data to be transmitted or the logical channel containing the data to be transmitted as the target attribute. Or, attribute requirements corresponding to the at least one piece of data to be transmitted or the logical channel containing a data to be transmitted, and part of data to be transmitted with a relatively high priority or a logical channel containing the data to be transmitted are taken as the target attribute. It should be understood that the target attribute may be one or more attributes.

For another example, the attribute requirement of most of the logical channel in the at least one logical channel containing a data to be transmitted may be taken as the target attribute; or, an attribute requirement corresponding to a logical channel whose priority level is higher than a preset threshold value in the at least one logical channel containing the data to be transmitted is taken as the target attribute.

In an example, the attribute requirement of the data to be transmitted or the attribute requirement of the logical channel containing the data to be transmitted at least includes: a Quality of Service (QoS) attribute.

Herein, the at least one piece of data to be transmitted is the data to be transmitted in the at least one logical channel.

With regard to processing of selecting the first transmission resource, multiple first transmission resources corresponding to the target attribute may be selected; or, any one of at least one transmission resource corresponding to the target attribute is selected as the first transmission resource.

For example, when the attribute requirement of the data to be transmitted is the QoS attribute, the target attribute may be determined according to the QoS attribute of the multiple data to be transmitted or part of data to be transmitted in the logical channel containing the data to be transmitted or the logical channel containing the data to be transmitted, and then at least one first transmission resource matched with the target attribute is selected from at least one transmission resource. In the implementation, one first transmission resource or multiple first transmission resources may be selected.

Herein, with regard to determining the target attribute based on an attribute requirement of the data to be transmitted or the logical channel containing the data to be transmitted, a highest attribute requirement may be selected as the target attribute. For example, taking QoS as an example, an attribute requirement with a highest QoS requirement may be selected as the target attribute. It should be understood that the target attributes may include more attributes besides the QoS attribute, such as an attribute of HARQ of requiring feedback, or an attribute of HARQ of requiring without feedback, etc., which is not exhaustive here.

The related configuration of the HARQ includes at least one of the following: HARQ transmission with feedback that may be performed; or HARQ transmission without feedback that may be performed.

In the implementation of the present application, an attribute configuration of at least one transmission resource is configured by a higher layer of the first terminal, or configured by a network device, or configured by another terminal except the first terminal.

When configured by the network device, it may be understood as being configured by a device such as a base station on a network side. The another terminal except the first terminal may be a second terminal; of course, it may also be another terminal except the first terminal and the second terminal, which is not exhaustive here. Being configured by the another terminal may be receiving configuration information sent by the another terminal, and obtaining an attribute configuration for at least one transmission resource from the configuration information, which may include, for example, an identifier of each transmission resource and its corresponding at least one attribute configuration.

The attribute requirement of the data to be transmitted or the logical channel containing the data to be transmitted is configured by a higher layer of the first terminal, or preconfigured, or configured by a network device, or configured by another terminal except the first terminal. Herein, when the attribute requirement of the data to be transmitted or the logical channel containing the data to be transmitted is preconfigured, the attribute requirement of the data to be transmitted or the logical channel containing the data to be transmitted does not contain a transmission resource selection mode attribute of network scheduling. Herein, the transmission resource selection mode attribute of network scheduling may be one of the attribute configuration of the transmission resource, that is, one of an association relationship between the transmission resource and the data to be transmitted.

For example, the first terminal determines, according to the attribute requirement of a different logical channel in the at least one logical channel, such as whether the HARQ transmission with feedback is needed, or which resource (pool) needs to be used for transmission, the attribute requirement of a corresponding logical channel; for example, a QOS requirement may be considered, for example, the attribute requirement corresponding to the logical channel with a highest QoS requirement in the logical channel containing the data to be transmitted are selected as the target attribute.

The first terminal selects, according to the above target attribute, one resource (pool) conforming to the target attribute, i.e., the first transmission resource, in the at least one transmission resource, such as at least one resource (pool) according to a different attribute configuration of each resource (pool), for data transmission.

Further, it should be pointed out that during transmission, the data in part of a logical channel that completely conforms to the attribute configuration of the first transmission resource in the at least one logical channel may be transmitted.

Or, during transmission, the data in the logical channel that does not conform to the attribute configuration of the first transmission resource may also be carried in the first transmission resource. For example, there are logical channels 1 to 5 at the present, in which the logical channels 1 and 2 do not conform to the attribute configuration of the first transmission resource, and the logical channels 3, 4, and 5 conform to the attribute configuration of the first transmission resource, but the logical channels 1 and 2 may still be transmitted on the first transmission resource. It should be understood that in this case, the data of at least one logical channel conforming to the attribute configuration may also be transmitted in the first transmission resource. Still taking the foregoing as an example, the logical channels 2, 3, and 4 may be transmitted in the first transmission resource, that is, part of the logical channels conforms to the attribute configuration and another part of the logical channels does not conform to the attribute configuration. At this time, a mode of selecting a logical channel may be combined with a priority of the logical channel (or understood as a priority threshold value). For example, if the logical channel 2 currently does not conform to the attribute configuration of the first transmission resource, but its priority is relatively high or higher than a priority threshold value, then the data of the logical channel 2 may be transmitted in the first transmission resource. Of course, there may be another mode of selecting a logical channel, which is not exhaustive here.

Further, when the data in the logical channel that does not conform to the attribute configuration of the first transmission resource is carried in the first transmission resource, it may be: the first transmission resource of HARQ that requires feedback may carry the data of an HARQ logical channel that does not require with feedback; on the contrary, it will not work; or, the first transmission resource of HARQ that does not require feedback may carry the data of an HARQ logical channel that requires feedback, and on the contrary, it will not work.

In addition, the QoS attribute requirement may also be considered in the foregoing example. In the first transmission resource, it may be OK, as long as the attribute requirement of the logical channel with a highest priority conforms to the attribute configuration of the first transmission resource, and another logical channel with a low priority may not conform to the attribute configuration of the first transmission resource. For example, the attribute of the logical channel with the highest priority (such as a highest priority determined based on a QoS attribute) requires an HARQ logical channel with feedback, and the attribute configuration of the first transmission resource is requiring HARQ with feedback. While the attribute requirement of the logical channel with a relatively low priority is HARQ without feedback, then at this time, since the logical channel with the highest priority conforms to the attribute configuration of the first transmission resource, a data of the logical channel with the highest priority and a data of at least one logical channel with a relatively low priority may be transmitted through the first transmission resource.

It should also be pointed out that the implementation of the present application may be applied to a D2D scenario or a Cellular scenario, or other more scenarios. In addition, the first terminal described above may be any terminal in the above scenario, and data interaction between the first terminal and the second terminal may be performed in the D2D scenario.

It can be seen that by adopting the solution described above, a first transmission resource conforming to a requirement can be selected according to an attribute configuration, such as a related configuration including HARQ and an association relationship between a transmission resource and data to be transmitted. Therefore, the selected transmission resource is made to be more satisfied with a requirement of data transmission, and adaptability between a data that needs to be transmitted and a transmission resource is also made to be higher.

The implementation of the present application further provides a method for selecting transmission data, applied to a first terminal. As shown in FIG. 4, the method includes acts 21 to 23.

In act 21, at least one first logical channel is selected according to a first attribute requirement of at least one piece of data to be transmitted or a logical channel containing data to be transmitted in at least one logical channel of the first terminal; herein, the first attribute requirement includes a related configuration of HARQ, and/or an association relationship between a transmission resource and the logical channel; the transmission resource is one of the following: a carrier, a resource pool, or a resource.

In act 22, a media access control (MAC) protocol data unit (PDU) is generated based on a radio link control (RLC) PDU of the at least one first logical channel.

In act 23, the MAC PDU is sent on a target transmission resource.

The implementation is same as the aforementioned implementation in that both of them can be applied to a D2D scenario or another scenario, such as Cellular.

The difference is that the implementation of the present application focuses on selecting a logical channel based on an attribute requirement, such as a related configuration of HARQ, as well as an association relationship between a transmission resource and a logical channel, that is, selecting a logical channel containing data to be transmitted.

The related configuration of HARQ includes at least one of the following: an HARQ transmission with feedback is capable of being performed; or an HARQ transmission without feedback is capable of being performed.

At least one first logical channel is selected according to a first attribute requirement of at least one piece of data to be transmitted or the logical channel containing the data to be transmitted in the at least one logical channel of the first terminal, including: at least one first logical channel is selected based on a second attribute requirement, as well as the first attribute requirement of the at least one piece of data to be transmitted or the logical channel containing the data to be transmitted in the at least one logical channel.

That is, when selecting the first logical channel, not only the first attribute requirement needs to be considered, but also the second attribute requirement needs to be combined with.

With regard to the method for determining the second attribute requirement, it may include: the second attribute requirement is determined based on an attribute requirement of a target transmission resource configuration, and/or, an attribute requirement of at least part of at least one piece of data to be transmitted; or, the second attribute requirement is determined based on an attribute requirement of a target transmission resource configuration, and/or, an attribute requirement configured by at least part of at least one logical channel containing the data to be transmitted.

It may be understood that the second attribute requirement is determined based on a common attribute requirement of at least part of all the data to be transmitted; wherein at least part of the data to be transmitted may be understood as data to be transmitted occupying 60% of all the data to be transmitted; or, it may be a designated part of the data to be transmitted, and the designation mode may be default, configured by a second terminal, or configured by another terminal. The processing mode corresponding to the logical channel containing the data to be transmitted is similar to it, so it will not be repeated here.

Furthermore, an attribute requirement matching both of the attribute requirement of the target transmission resource and the attribute requirement of the data to be transmitted may be regarded as a second attribute requirement. For example, if the attribute requirement of the target transmission resource and at least part of the data to be transmitted is HARQ with feedback, it is determined to be the second attribute requirement.

Or, the attribute requirement of the target transmission resource configuration includes a QoS attribute of the target resource configuration; accordingly, the attribute requirement of at least part of the data to be transmitted or configured by the logical channel containing the data to be transmitted includes a QoS attribute of the at least part of the data to be transmitted or configured by the logical channel containing the data to be transmitted.

The second attribute requirement conforms to at least one attribute requirement in the attribute requirement of the target transmission resource configuration.

In addition, the second attribute requirement conforms to the attribute requirement of at least part of the data to be transmitted or configuration of the logical channel containing the data to be transmitted.

For example, the attribute requirement of the target transmission resource may include a QoS attribute, and correspondingly, the attribute requirement of the data to be transmitted may also include a QoS attribute. Furthermore, when determining the second attribute requirement, the QoS attribute in the second attribute requirement may be determined based on the QoS attributes of both thereof.

For another example, the attribute requirement of the target transmission resource contains attribute requirements 1, 2, and 3; then the second attribute requirement may conform to the attribute requirements 1 and 2, or all the attribute requirements 1 to 3 therein. For example, the attribute requirements of part of the data to be transmitted are 1 and 2, then the second attribute requirement at least contains the attribute requirements 1 or 2 of the data to be transmitted.

The first attribute requirement of the data to be transmitted or the configuration of the logical channel containing the data to be transmitted is configured by a higher layer of the first terminal, pre-configured, configured by a network device, or configured by another terminal except the first terminal.

When the first attribute requirement of the data to be transmitted or the configuration of the logical channel containing the data to be transmitted is pre-configuration, the first attribute requirement of the data to be transmitted does not contain a resource selection mode attribute of network scheduling. Herein, the transmission resource selection mode attribute of network scheduling may be one of the attribute configuration of the transmission resource, that is, one of the association relationship between the transmission resource and the data to be transmitted.

At least part of the at least one first logical channel conform to the second attribute requirement. That is, not all of the selected first logical channels conform to the second attribute requirement, a part of them may do; for example, the first logical channel with the highest priority may conform to the second attribute requirement, and the first logical channel with a relatively low priority may not conform to the second attribute requirement.

Specifically, at least part of the at least one first logical channel conform to the second attribute requirement, may be at least one of following: the at least one first logical channel only contains a logical channel that conforms to the second attribute requirement; at least part of the at least one first logical channel does not conform to the second attribute requirement; or the logical channel with a highest priority among the at least one first logical channel conforms to the second attribute requirement.

For example, there are first logical channels 1 to 5 at the present, wherein the first logical channels 1 and 2 do not conform to the second attribute requirement, and the first logical channels 3, 4, and 5 conform to the second attribute requirement. One case is that only the first logical channels 3, 4, and 5 can be transmitted. Another case is that, at least one of the first logical channels 1 and 2 may be transmitted, and at this time, at least one of the first logical channels 3, 4, and 5 may also be transmitted. Or, there are multiple first logical channels, and when the first logical channel 2 has a highest priority, then the multiple first logical channels may be transmitted in the first transmission resource. In addition, the above multiple first logical channels may be multiple logical channels selected out from the at least one logical channel.

Herein, the at least part of the at least one first logical channel does not conform to the second attribute requirement, including: the second attribute requirement is to perform the HARQ transmission with feedback, and the at least one first logical channel contains a logical channel with an attribute requirement of performing the HARQ transmission without feedback; or, the second attribute requirement is to perform the HARQ transmission without feedback, and the at least one first logical channel includes a logical channel with an attribute requirement of performing the HARQ transmission with feedback.

In addition, the QoS attribute requirement may also be considered in the foregoing example. In the first transmission resource, it may be OK, as long as an attribute requirement of a logical channel with a highest priority conforms to an attribute configuration of the target transmission resource, and another logical channel with a low priority may not conform to the attribute configuration of the target transmission resource. For example, an attribute of the logical channel with the highest priority (such as a highest priority determined based on the QoS attribute) requires an HARQ logical channel with feedback, and the attribute configuration of the target transmission resource is requiring HARQ with feedback, while an attribute requirement of a logical channel with a relatively low priority is HARQ without feedback, then at this time, since the logical channel with the highest priority conforms to the attribute configuration of the target transmission resource, the data of the logical channel with the highest priority and the data of at least one logical channel with a relatively low priority may be transmitted through the target transmission resource.

It should also be understood that the aforementioned target transmission resources may be one or multiple.

In an implementation of the present application, a situation may also be considered. For example, if there are multiple logical channel sets at present, one logical channel set may be selected first, and then the first logical channel may be selected from the one logical channel set, which is as follows: the method further includes a logical channel set is selected; that is, one logical channel set is selected from multiple logical channel sets.

At least one first logical channel is selected according to the first attribute requirement of at least one piece of the data to be transmitted or the logical channel containing the data to be transmitted in the at least one logical channel of the first terminal, including: the at least one first logical channel is selected from the logical channel set according to the attribute requirement of the data to be transmitted corresponding to at least one logical channel in the logical channel set or a logical channel containing the data to be transmitted.

Herein, the logical channel in the logical channel set has a same target address. That is, multiple logical channel sets may be divided by a target address, and logical channels with a same target address may be divided into a same logical channel set.

It should be pointed out that a mode of selecting the first logical channel from the logical channel set is same as the mode of selecting the first logical channel from the multiple logical channels mentioned above, so it will not be repeated here again.

It can be seen that by adopting the above solution, the first logical channel that conforms to a requirement can be selected according to the attribute configuration, such as the related configuration including HARQ and the association relationship between the transmission resource and the data to be transmitted, so that the data of the first logical channel can be transmitted in the target transmission resource. Therefore, the selected transmission resource is made to be more satisfied with a requirement of data transmission, and adaptability between a data that needs to be transmitted and a transmission resource is also made to be higher.

Figure 5:
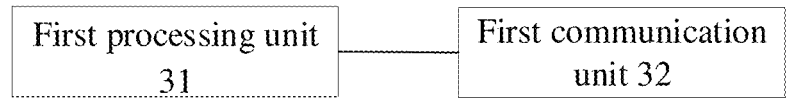
FIG. 5 is a first schematic diagram of a structure of a terminal according to an implementation of the present application.

An implementation of the present application provides a terminal, as shown in FIG. 5, including: a first processing unit 31, configured to select a first transmission resource from at least one transmission resource according to an attribute configuration of the at least one transmission resource; herein, the transmission resource is one of the following: a carrier, a resource pool, or a resource; wherein, the attribute configuration includes a related configuration of Hybrid Automatic Repeat reQuest (HARQ), and/or an association relationship between a transmission resource and data to be transmitted; and a first communication unit 32, configured to perform data transmission based on the selected first transmission resource.

Herein, the carrier, the resource pool, and the resource may be understood as transmission resources with different granularity.

The solution provided in the implementation of the present application may be applied to a D2D scenario or another scenario, such as a Cellular scenario. It should be pointed out that data transmission is performed based on the selected first transmission resource, which may specifically be, in the D2D scenario: the first communication unit 32 performs communication with a second terminal based on the selected first transmission resource; and which may specifically be, in another scenario, such as the Cellular scenario: the first communication unit 32 performs communication with a network device based on the selected first transmission resource.

Based on the foregoing solution, the implementation of the present application may further include a first processing unit 31, configured to select the data to be transmitted or the logical channel containing the data by using the first transmission resource, from the at least one piece of data to be transmitted or the logical channel containing the data to be transmitted, based on the attribute configuration of the at least one transmission resource. That is, the data to be transmitted finally may also be selected according to an attribute of a transmission resource as well as an attribute requirement.

The first processing unit 31 selects a first transmission resource from the at least one transmission resource according to the attribute configuration of the at least one transmission resource and at least one target attribute.

The attribute requirement of the data to be transmitted or the attribute requirement of the logical channel containing the data to be transmitted at least includes: a Quality of Service (QoS) attribute.

Herein, the at least one piece of the data to be transmitted is the data to be transmitted in the at least one logical channel.

The attribute configuration of at least one transmission resource is configured by a higher layer of the first terminal, or configured by a network device, or configured by another terminal except the first terminal.

The attribute requirement of the data to be transmitted or the logical channel containing the data to be transmitted is configured by a higher layer of the first terminal, or preconfigured, or configured by a network device, or configured by another terminal except the first terminal. Herein, when the attribute requirement of the data to be transmitted or the logical channel containing the data to be transmitted is preconfigured, the attribute requirement of the data to be transmitted or the logical channel containing the data to be transmitted does not contain a transmission resource selection mode attribute of network scheduling. Herein, the transmission resource selection mode attribute of network scheduling may be one of an attribute configuration of a transmission resource, that is, one of an association relationship between the transmission resource and the data to be transmitted.

Further, when the data in the logical channel that does not conform to the attribute configuration of the first transmission resource is carried in the first transmission resource, it may be: in the first transmission resource of HARQ that requires feedback, the data of an HARQ logical channel that does not require with feedback may be carried; on the contrary, it will not work; or, in the first transmission resource of HARQ that does not require feedback, the data of an HARQ logical channel that requires feedback may be carried, and on the contrary, it will not work.

The related configuration of HARQ includes at least one of the following: an HARQ transmission with feedback is capable of being performed; or an HARQ transmission without feedback is capable of being performed.

It can be seen that by adopting the above solution, the first transmission resource meeting a requirement can be selected according to the attribute configuration, such as the related configuration including HARQ, and the association relationship between the transmission resource and the data to be transmitted; therefore, the selected transmission resource is made to be more in line with the requirement of data transmission, and adaptability between the data that needs to be transmitted and a transmission resource is also made to be higher.

Figure 6:
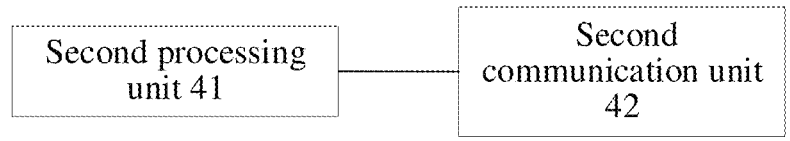
FIG. 6 is a second schematic diagram of a structure of a terminal according to an implementation of the present application.

An implementation of the present application also provides a first terminal, as shown in FIG. 6, including: a second processing unit 41, configured to select at least one first logical channel according to a first attribute requirement of at least one piece of data to be transmitted or a logical channel containing the data to be transmitted in at least one logical channel of the first terminal; herein, the attribute requirement includes a related configuration of HARQ, and/or an association relationship between a transmission resource and the logical channel; the transmission resource is one of the following: a carrier, a resource pool, or a resource; and generate a media access control (MAC) protocol data unit (PDU) based on a radio link control (RLC) PDU of the at least one first logical channel; and a second communication unit 42, configured to send the MAC PDU on a target transmission resource.

The implementation of the present application focuses on selecting the logical channel based on an attribute requirement, such as a related configuration of HARQ, as well as an association relationship between the transmission resource and the logical channel, that is, selecting the logical channel containing the data to be transmitted.

The related configuration of HARQ includes at least one of the following: an HARQ transmission with feedback is capable of being performed; or an HARQ transmission without feedback is capable of being performed.

The second processing unit 41 selects at least one first logical channel based on a second attribute requirement, as well as a first attribute requirement of at least one piece of data to be transmitted or the logical channel containing the data to be transmitted in the at least one logical channel.

The second processing unit 41 determines the second attribute requirement based on an attribute requirement of a target transmission resource configuration, and/or an attribute requirement of at least part of at least one piece of data to be transmitted; or, determines the second attribute requirement based on an attribute requirement of a target transmission resource configuration, and/or an attribute requirement of configuration of at least part of at least one logical channel containing the data to be transmitted.

The attribute requirement of the target transmission resource configuration includes a QoS attribute of the target resource configuration; accordingly, the attribute requirement of the at least part of the data to be transmitted or configuration of the logical channel containing the data to be transmitted includes a QoS attribute of the at least part of data to be transmitted or configuration of the logical channel containing the data to be transmitted.

The second attribute requirement conforms to at least one attribute requirement in the attribute requirement of the target transmission resource configuration.

In addition, the second attribute requirement conforms to the attribute requirement of the at least part of the data to be transmitted or the configuration of the logical channel containing the data to be transmitted.

The first attribute requirement of the data to be transmitted or the configuration of the logical channel containing the data to be transmitted is configured by a higher layer of the first terminal, or pre-configured, or configured by a network device, or configured by another terminal except the terminal.

When the first attribute requirement of the data to be transmitted or the configuration of the logical channel containing the data to be transmitted is pre-configured, the first attribute requirement of the data to be transmitted does not contain a resource selection mode attribute of network scheduling. Herein, the transmission resource selection mode attribute of network scheduling may be one of an attribute configuration of a transmission resource, that is, one of the association relationship between the transmission resource and the data to be transmitted.

At least part of logical channels in the at least one first logical channel conform to the second attribute requirement. That is, not all of the selected first logical channels conform to the second attribute requirement, but a part of them may do; for example, the first logical channel with a highest priority may conform to the second attribute requirement, and the first logical channel with a relatively low priority may not conform to the second attribute requirement.

Specifically, at least part of the at least one first logical channel conform to the second attribute requirement, which is at least one of the following: the at least one first logical channel only contains the logical channel conforming to the second attribute requirement; at least part of at least one first logical channel does not conform to the second attribute requirement; or the logical channel with a highest priority among the at least one first logical channel conforms to the second attribute requirement.

Herein, the at least part of the at least one first logical channel does not conform to the second attribute requirement, including: the second attribute requirement is to perform HARQ transmission with feedback, and the at least one first logical channel contains a logical channel with an attribute requirement of performing the HARQ transmission without feedback; or, the second attribute requirement is to perform HARQ transmission without feedback, and the at least one first logical channel contains a logical channel with an attribute requirement of performing the HARQ transmission with feedback.

In an implementation of the present application, a situation may also be considered. For example, if there are multiple logical channel sets at present, one logical channel set may be selected first, and then the first logical channel may be selected from the logical channel set, which is as the follows: the second processing unit 41 selects a logical channel set; that is, one logical channel set is selected from the multiple logical channel sets.

The second processing unit 41 selects the at least one first logical channel from the logical channel set according to an attribute requirement of the data to be transmitted corresponding to at least one logical channel in the logical channel set or a logical channel containing the data to be transmitted.

It can be seen that by adopting the above solution, the first logical channel that conforms to a requirement can be selected according to the attribute configuration, such as the related configuration including HARQ and the association relationship between the transmission resource and the data to be transmitted, so that the data of the first logical channel can be transmitted in the target transmission resource. Therefore, the selected transmission resource is made to be more in line with a requirement of data transmission, and adaptability between the data that needs to be transmitted and a transmission resource is also made to be higher.

Figure 7:
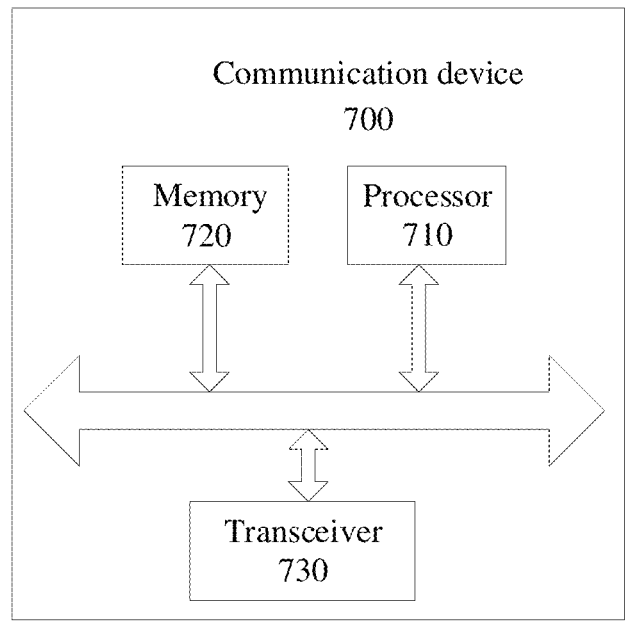
FIG. 7 is a schematic diagram of a structure of a communication device according to an implementation of the present application.

FIG. 7 is a schematic structural diagram of a communication device 700 according to an implementation of the present application, herein the communication device in the implementation of the present application may be specifically the first terminal or the second terminal in the previous implementation. The communication device 700 shown in FIG. 7 includes a processor 710 which may call and run a computer program from a memory to implement the methods in accordance with the implementations of the present application.

Optionally, as shown in FIG. 7, the communication device 700 may further include a memory 720. The processor 710 may call and run the computer program from the memory 720 to implement the methods in the implementations of the present application.

The memory 720 may be a separate device independent of the processor 710 or may be integrated in the processor 710.

Optionally, as shown in FIG. 7, the communication device 700 may further include a transceiver 730, and the processor 710 may control the transceiver 730 to communicate with other devices. Specifically, the transceiver 730 may send information or data to other devices or receive information or data sent by other devices.

The transceiver 730 may include a transmitter and a receiver. The transceiver 730 may further include antennas, and the number of which may be one or more.

Optionally, the communication device 700 may specifically be a terminal of an implementation of the present application, and the communication device 700 may implement the corresponding processes implemented by a mobile terminal/terminal device in various methods of the implementations of the present application, which will not be repeated here again for brevity.

Figure 8:
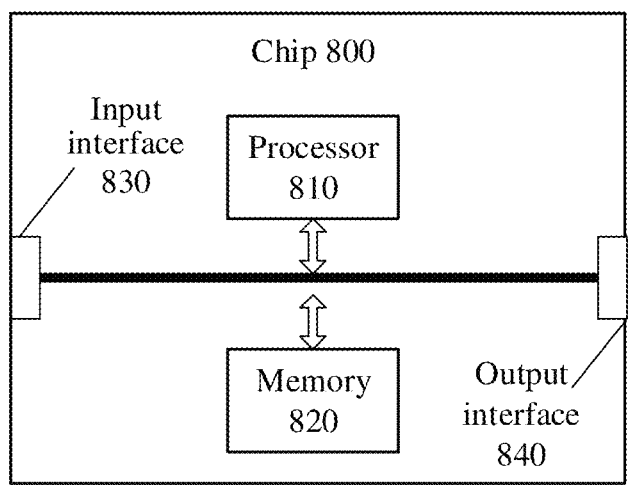
FIG. 8 is a schematic block diagram of a chip according to an implementation of the present application.

FIG. 8 is a schematic diagram of a structure of a chip in accordance with an implementation of the present application. The chip 800 shown in FIG. 8 includes a processor 810. The processor 810 may call and run a computer program from a memory to implement the methods in accordance with the implementations of the present application.

Optionally, as shown in FIG. 8, the chip 800 may further include a memory 820. The processor 810 may call and run the computer program from the memory 820 to implement the methods in the implementations of the present application.

The memory 820 may be a separate device independent of the processor 810 or may be integrated in the processor 810.

Optionally, the chip 800 may further include an input interface 830. The processor 810 may control the input interface 830 to communicate with other devices or chips. Specifically, the processor 1210 may acquire information or data sent by other devices or chips.

Optionally, the chip 800 may further include an output interface 840. The processor 810 may control the output interface 840 to communicate with other devices or chips. Specifically, the processor 1210 may output information or data to other devices or chips.

Optionally, the chip may be applied to the terminal device in the implementations of the present application, and the chip may implement the corresponding processes implemented by the terminal device in various methods in accordance with the implementations of the present application, which will not be repeated herein for brevity.

It should be understood that the chip mentioned in the implementations of the present application may be referred to as a system-level chip, a system chip, a chip system or a system-on-chip, etc.

It should be understood that the processor in the implementations of the present application may be an integrated circuit chip having a signal processing capability. In an implementation process, each of the acts of the foregoing method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, acts and logical block diagrams disclosed in the implementations of the present application. The general purpose processor may be a microprocessor, or the processor may also be any conventional processor, or the like. The acts of the methods disclosed in the implementations of the present application may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the acts of the foregoing methods in combination with its hardware.

It may be understood that the memory in the implementations of the present application may be a volatile memory or a non-volatile memory, or may include both a volatile memory and a non-volatile memory. The non-volatile memory may be a Read-Only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but is not limited to, these and any other suitable types of memories.

It should be understood that the foregoing memory is described in an exemplary but non-limiting sense. For example, the memory in the implementations of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present application is intended to include, but not be limited to, these and any other suitable type of memory.

An implementation of the present application further provides a computer-readable storage medium configured to store a computer program.

Optionally, the computer readable storage medium may be applied to a network device in an implementation of the present application, and the computer program enables a computer to perform the corresponding processes implemented by the network device in various methods of the implementations of the present application, which will not be repeated here for brevity.

Optionally, the computer readable storage medium may be applied in a terminal device of the implementations of the present application, and when the computer program is run on a computer, the computer is enabled to perform corresponding processes implemented by the mobile terminal/terminal device in various methods of the implementations of the present application, which will not be repeated here for brevity.

An implementation of the present application further provides a computer program product including computer program instructions.

Optionally, the computer program product may be applied to a network device in an implementation of the present application, and the computer program instructions enable a computer to perform the corresponding processes implemented by the network device in various methods of the implementations of the present application, which will not be repeated here for brevity.

Optionally, the computer program product may be applied to a mobile terminal/terminal device in an implementation of the present application, and the computer program instructions enable a computer to perform the corresponding processes implemented by the mobile terminal/terminal device in various methods of the implementations of the present application, which will not be repeated here for brevity.

An implementation of the present application further provides a computer program.

Optionally, the computer program may be applied to the network device in the implementations of the present application, and the computer program, when running on a computer, enables the computer to perform the corresponding processes implemented by the network device in various methods of the implementations of the present application, which will not be repeated herein for brevity.

Optionally, the computer program may be applied to a mobile terminal/terminal device in an implementation of the present application. When the computer program is run on a computer, the computer is enabled to perform the corresponding processes implemented by the mobile terminal/terminal device in various methods of the implementations of the present application, which will not be repeated here for brevity.

Those of ordinary skill in the art will recognize that the exemplary elements and algorithm acts in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present application.

Those skilled in the art may clearly understand that for the sake of convenience and conciseness of description, the specific working processes of the systems, devices and units described above may be described with reference to the corresponding processes in the above method implementations and will not be repeated herein again.

In several implementations provided by the present application, it should be understood that the disclosed systems, apparatuses and methods may be implemented in another mode. For example, the device implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present application may be integrated into one processing unit, or may exist physically separately, or two or more than two units may be integrated into one unit.

The function, if achieved in a form of software functional units and sold or used as a separate product, may be stored in a computer-readable storage medium. Based on this understanding, the technical solution of the present application, in essence, or the part contributing to the prior art, or the part of the technical solution, may be embodied in the form of a software product, which is stored in a storage medium, and includes several instructions for causing a computer device (which may be a personal computer, a server, a network device or the like) to perform all or part of the acts of the method described in various implementations of the present application. The aforementioned storage medium includes various media, such as a U disk, a mobile hard disk, a read-only memory (ROM), a random access memory (RAM), a magnetic disk, or an optical disk, which are capable of storing program codes.

What are described above are merely specific implementations of the present application, but the protection scope of the present application is not limited thereto. Any variation or substitution that may be easily conceived by a person familiar with the art within the technical scope disclosed by the present application shall be included within the protection scope of the present application. Therefore, the protection scope of the present application shall be subject to the protection scope of the claims.

What is claimed is:

1. A method for selecting a transmission resource, applied to a first terminal, comprising:
   selecting a first transmission resource from at least one transmission resource according to an attribute configuration of the at least one transmission resource and at least one target attribute; wherein, the at least one transmission resource is a resource pool; wherein the at least one target attribute is determined based on an attribute requirement of at least part of at least one piece of the data to be transmitted; or, the at least one target attribute is determined based on the attribute requirement of the at least part of at least one logical channel containing the data to be transmitted; and
   performing data transmission based on the selected first transmission resource;
   wherein, the attribute configuration comprises a related configuration of Hybrid Automatic Repeat reQuest (HARQ);
   wherein the related configuration of HARQ comprises at least one of following:
   an HARQ transmission with feedback is capable of being performed; or
   an HARQ transmission without feedback is capable of being performed.

2. The method of claim 1, wherein the attribute configuration corresponding to the at least one transmission resource is configured by a network device.

3. A terminal, comprising a memory and a processor, wherein the processor is configured to execute instructions stored in the memory to perform following operations:
   selecting a first transmission resource from at least one transmission resource according to an attribute configuration of the at least one transmission resource and at least one target attribute; wherein, the at least one transmission resource is a resource pool; wherein the at least one target attribute is determined based on an attribute requirement of at least part of at least one piece of the data to be transmitted; or, the at least one target attribute is determined based on the attribute requirement of the at least part of at least one logical channel containing the data to be transmitted; and performing data transmission based on selected first transmission resource;

wherein, the attribute configuration comprises a related configuration of Hybrid Automatic Repeat reQuest (HARQ); wherein the related configuration of HARQ comprises at least one of following:

an HARQ transmission with feedback is capable of being performed; or an HARQ transmission without feedback is capable of being performed.

4. The terminal of claim 3, wherein the attribute configuration corresponding to the at least one transmission resource is configured by a network device.

5. A terminal, comprising a processor and a memory configured to store a computer program capable of being run on the processor, wherein the memory is configured to store a computer program; the processor is configured to call and run the computer program stored in the memory to execute acts of the method of claim 1.

6. A chip, comprising: a processor, configured to call and run a computer program from a memory, to enable a device in which the chip is installed to execute the method of claim 1.

7. A non-transitory computer readable storage medium, configured to store a computer program, wherein when the computer program is run on a computer, the computer is enabled to execute acts of the method of claim 1.

* * * * *